Patented Aug. 17, 1937

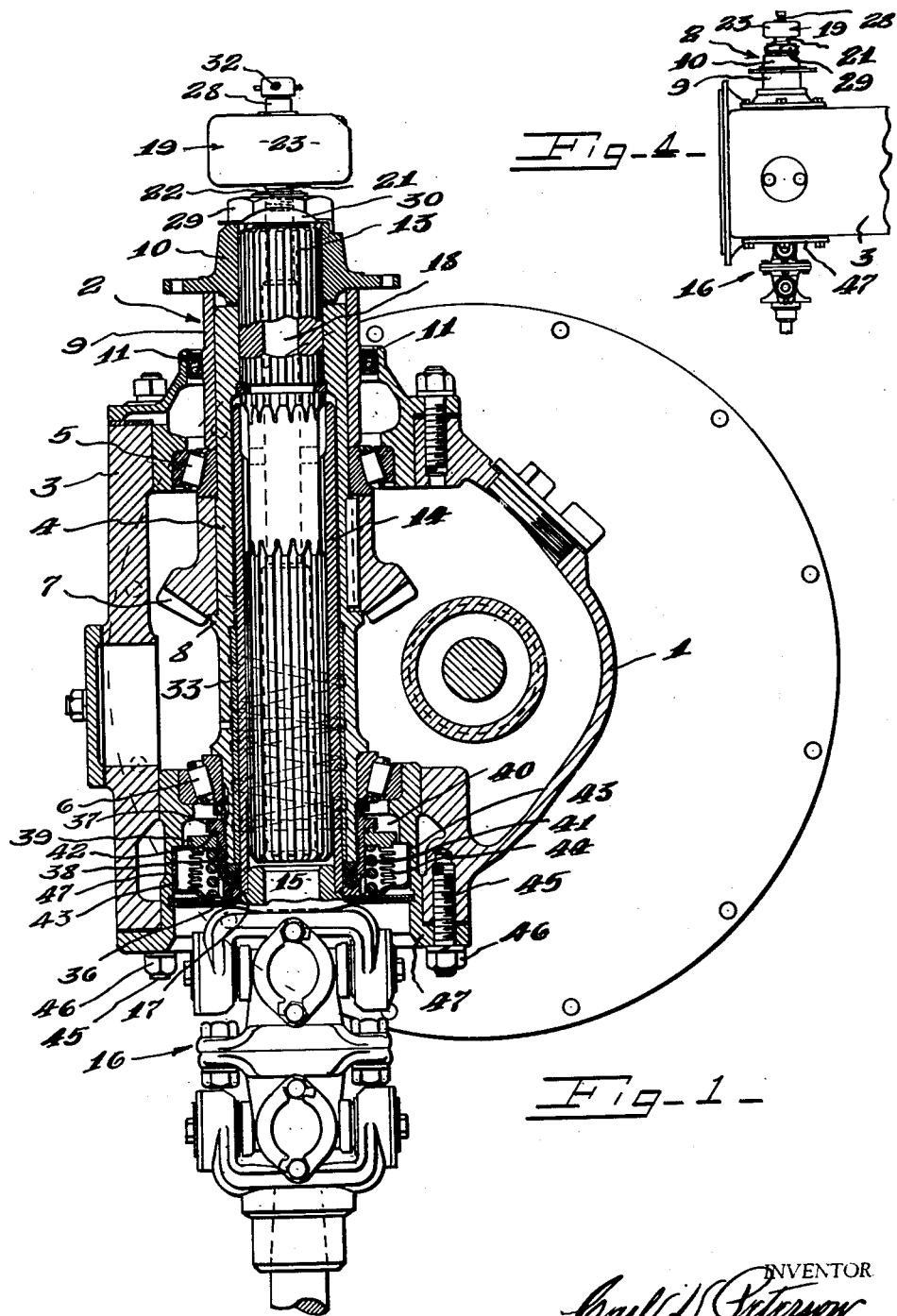

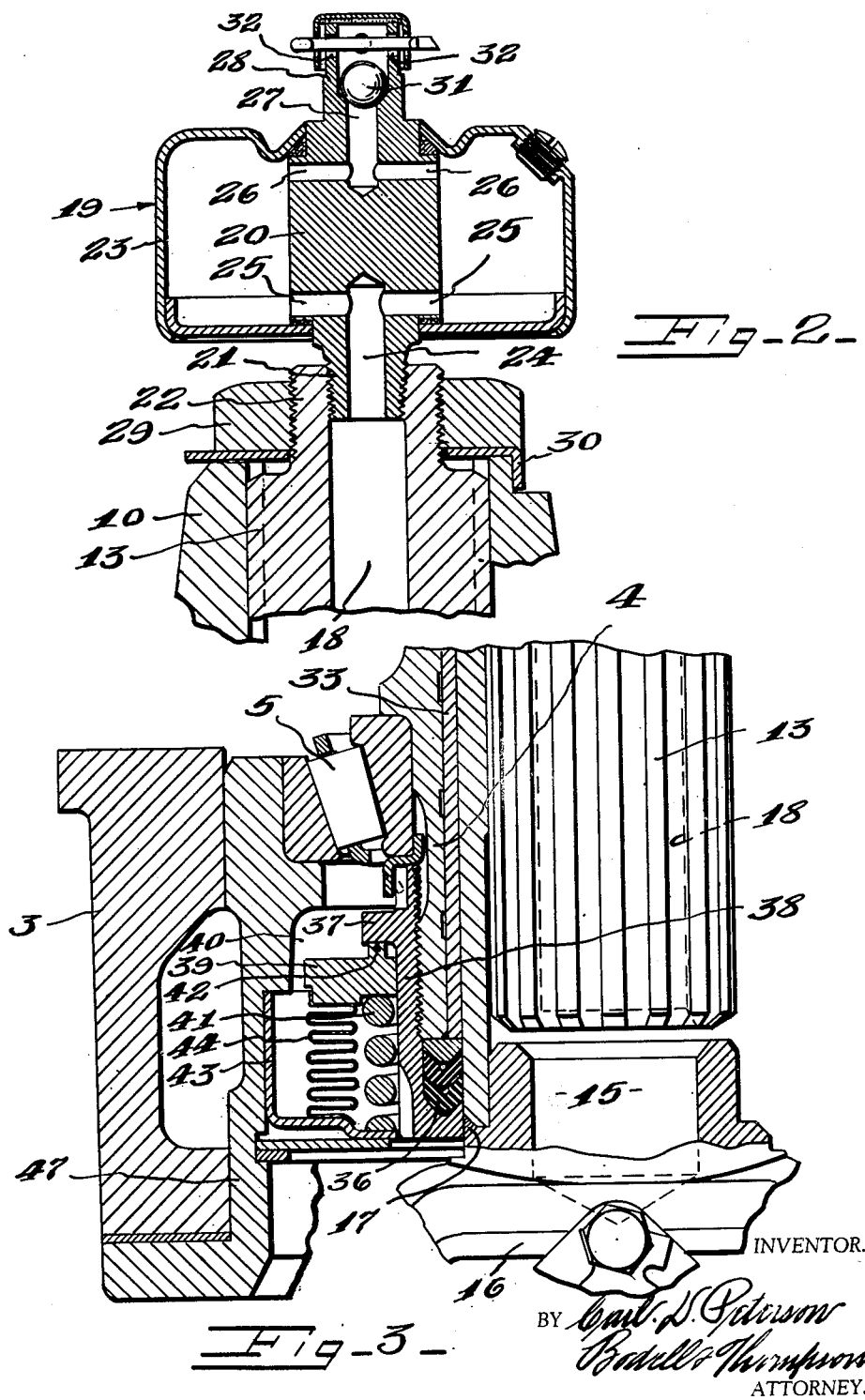

2,090,066

UNITED STATES PATENT OFFICE 2,090,066

LUBRICATING MEANS FOR DRIVE MECHANISM

Carl D. Peterson, Toledo, Ohio

Application October 17, 1935, Serial No. 45,464

9 Claims. (Cl. 64—1)

This invention relates to power transmitting or drive mechanism, and has for its object an oil sealing means in transmission mechanisms including a shaft telescoping within a sleeve, more particularly, where the shaft and sleeve are arranged in an upright position.

It further has for its object an oil sealing means whereby a partial vacuum is formed within the oil reservoir within the sleeve by the reciprocating action of the shaft in the sleeve, so that any oil that would tend to escape is drawn back by the vacuum, said means including a relief valve which permits the release of pressure from within the mechanism of the oil reservoir, when pressure above atmospheric is developed, as will be hereinafter explained, during the reciprocating action of the shaft and the sleeve.

It further has for its object an oil sealing means or joint for preventing escape of oil from the interior of the mechanism to the outside.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view of a transmission mechanism embodying this invention.

Figure 2 is an enlarged detail sectional view of the breather and associated parts.

Figure 3 is an enlarged detail sectional view of the sealing means at the lower end of the outer hollow drive shaft and the casing.

Figure 4 is a diagrammatic view illustrating the relative arrangement of this transmission mechanism and the gear box with which it is associated, of a motor vehicle.

This oil sealing means is shown as embodied in a final drive between the gear box and the axle, the final drive including a telescoping shaft and sleeve, usually arranged with their axes in upright position.

The invention comprises, generally, telescoping sleeve and shaft elements having relative axial movement and connected together so that one transmits rotary movement to the other, the sleeve being at the lower end of the final drive and being closed at its lower end forming an oil reservoir, and the shaft being formed with a lengthwise oil passage opening through its ends, a breather communicating with the passage at the upper end of the shaft, that is, the end remote from the closed end of the sleeve, said breather being air tight and having a check valve therein for retarding or preventing the inlet of air during relative outward axial movement of the shaft and the sleeve, that is, during such movements as would tend to create a suction between the shaft and the sleeve and hence a partial vacuum within the sleeve or oil reservoir, the valve opening to relieve the pressure within the oil reservoir when the internal pressure becomes greater than atmospheric due to inward axial movement of the shaft and the sleeve.

1 designates the gear box of the transmission gearing, this enclosing any suitable form of change-speed gearing, the drive shaft of which is connected to the engine of a vehicle through the usual clutch.

2 designates generally the final drive mechanism here shown as arranged in vertical position and supported in upright or vertical position at one side of the gear box by a casing 3 supported by the gear box 1. The general features of the final drive form no part of this invention.

This invention relates to the oil sealing features hereinafter described.

4 designates an outer hollow drive shaft suitably journalled in bearings 5, 6, in the casing 3, the bearings being here shown as conical roller bearings, arranged to take the thrust in opposite directions.

7 is a gear mounted on the hollow shaft 4 and keyed thereto, this being shown as a bevel gear. It is arranged to mesh with a gear within the gear box through which the power is transmitted during the various gear changes, to the hollow drive shaft 4. The hub of the gear 7 seats at 8 at one end against an annular shoulder on the hollow drive shaft 4 and its other end against the inner bearing ring of the bearing 5. A spacer 9 is interposed between the inner bearing ring of the bearing 5 and a cap 10. A suitable gland or packing 11 is interposed between the cap 12 of the casing 3 and the periphery of the spacing ring 9.

13 and 14 designate respectively, an inner shaft and a sleeve within the hollow shaft 4, the shaft 13 being connected to the hollow shaft 4 to rotate therewith and also with the sleeve. As here shown, the inner shaft 13 is connected to the upper portion of the hollow drive shaft 4 by means of interfitting splines, and also is connected to the sleeve 14 by interfitting splines, so that the rotary motion of the gear 7 is transmitted to the sleeve through the drive shaft 4 and inner shaft 13.

The sleeve 14 is closed at its lower end forming an oil reservoir 15. This sleeve is connected to a universal joint structure 16 of any suitable construction. The universal joint structure is here shown as formed with a hub fitting into the lower end of the sleeve 14, so that the hub closes the lower end of the sleeve. The hub and the sleeve, when assembled, are sealed together as by welding at 17.

The inner shaft 13 is formed with a lengthwise passage 18, here shown as an axial bore opening through its upper and lower ends and communicating at its upper end with a combined oil separator and breather 19. This includes a body 20 having a threaded shank 21 screwing into a reduced upper end 22 of the inner shaft 13 and outer air tight casing 23 around the body 20, the body having a bore 24 extending through the shank thereof and communicating with lateral bores 25 opening into the casing 23 and also with lateral bores 26 at the upper end thereof and communicating with an upwardly extending axial bore 27 communicating with the check valve casing 28. The reduced upper end 22 of the shaft 13 is secured to the cap 10 by a nut 29 threading thereon against the upper end of the head 10, a suitable nut lock 30 being interposed between the nut 29 and the head 10. The check valve is here shown as a ball 31 seating in an enlargement at the upper end of the bore 27, the casing 28 communicates with the outer air above the ball 31 through suitable passages 32. The element 19 also acts as a combined breather and oil separator and also serves as a means through which oil may be supplied through the bore 18 of the shaft 13 to within the sleeve 14. The casing 19 of this breather and oil separator element is provided with a suitable inlet opening and has a plug or closure. During the rotation of this breather and oil separator with the shaft 13, the oil is thrown outward against the peripheral walls of the casing 19 and hence held from passing back inwardly radially through the radial passages 26 and out past the check valve 31. During this centrifugal action, the heavier oil is thrown outward and freed, more or less, of the lighter air which is free to breathe out past the check valve 31.

During movement of the vehicle over the ground, especially when bumps are encountered, by the drive wheels, which are connected to the axle driven from the sleeve through the universal joint, the sleeve is reciprocated relatively to the drive shaft 4 and the inner shaft 13. During the up stroke of the sleeve 14, the air in the breather and the sleeve is compressed, opening the check valve and permitting the air to pass out. However, on the down stroke of the sleeve, the check valve seats and a partial vacuum is formed. Although the partial vacuum may be gradually broken, nevertheless, during the greater part of the running, the system is under a slight vacuum which prevents oil leakage or holds back any tendency of oil to work out. Under actual running conditions, the sleeve is reciprocating more or less all the time, but now and then, a relatively large bump is encountered by the drive axle which sets up a sufficiently large reciprocation of the sleeve to practically maintain a partial vacuum in the sleeve.

A suitable sleeve 33 of porous material is interposed between the lower portion of the sleeve 14 and the inner surface of the hollow drive shaft 4, this being located in an annular enlargement of the bore of the hollow drive shaft 4. Packing rings 36 are located at the lower edge of the hollow drive shaft 4. However, in order to prevent the leakage of oil out from the casing at the lower end of the hollow drive shaft 4, and from between the sleeve and the drive shaft, an oil seal is provided at the lower end of the casing 3 between the hollow drive shaft 4 and the casing. This consists of two metal parts, one rotatable with the hollow drive shaft 4 and the other stationary or carried by the casing 3, these two parts having engaging annular faces, one spring-pressed against the other. These engaging faces are carefully lapped surfaces. As here shown, the part provided on the drive shaft 4 is an annular flange 37 here illustrated as provided on a sleeve 38 threading on the lower end of the hollow drive shaft 4, and the stationary part is here shown as a ring 39 having an annular rib thereon, the edge face of which engages the lower face of the flange 37. The parts 37 and 39 are located in a recess 40 associated with the case 3 about the hollow drive shaft 4. The ring 39 is spring-pressed by spring 41 to hold the lapping surfaces engaged at 42 and usually the spring is interposed between the ring 39 and the cap 43 for the recess 40. The escape of oil is further prevented by a bellows 44 secured, as by soldering, at one end to the ring 39 and at its other end to the cap 43. The cap 43 has a portion which telescopes into and fits the walls of the recess 40. The spring 41 is located within the bellows. Thus, the sealing means at the lower end of the drive shaft is entirely metallic without packing subject to wear. As here shown, the recess 40 is formed in a part detachably secured to the case 3 as by studs and nuts 45 and 46. This part is an annular block 47 concentric with the sleeve.

The breather assembly 19 may be removed by unscrewing it from the upper end of the inner shaft 13 for the purpose of determining the amount of oil in the oil reservoir by means of a dip stick and for filling the reservoir with oil.

The oil sealing means is particularly advantageous in that a partial vacuum is maintained tending to hold the oil from escape without additional parts other than a breather and check valve, and a motion inherent in the mechanism is used for maintaining a vacuum, and further in that leakage of oil is prevented at the lower end of the final drive shaft adjacent the universal joint, by a wholly metallic oil seal not subject to wear. In so far as maintaining the partial vacuum is concerned, the breather and separator feature may be omitted and the check valve only used.

What I claim is:—

1. A drive mechanism comprising telescoping sleeve and shaft elements having relative axial movement and connected together so that one transmits rotary movement to the other, the shaft slidably fitting the sleeve, the sleeve being closed at one end and the shaft being formed with a lengthwise passage opening through its end, and a breather and separator communicating with the end of the shaft remote from the closed end of the sleeve.

2. A drive mechanism comprising telescoping sleeve and shaft elements having relative axial movement and connected together so that one transmits rotary movement to the other, the shaft slidably fitting the sleeve, the sleeve being closed at one end and the shaft being formed with a lengthwise passage opening through its end, and a breather and centrifugal oil separator mounted on the end of the shaft remote from the closed end of the sleeve, and rotatable with the shaft.

3. A drive mechanism comprising telescoping sleeve and shaft elements having relative axial movement and connected together, so that one transmits rotary movement to the other, the sleeve being closed at one end to form an oil receptacle, the shaft being formed with a lengthwise passage opening through its ends, and a breather and separator communicating with the end of the shaft remote from the closed end of the sleeve, the breather having means for separating the air from the oil and being also formed with a check valve for retarding the inlet of air during relative axial outward movement of the shaft and the sleeve elements, and to relieve the pressure created during relative inward movement of said elements.

4. A drive mechanism comprising telescoping sleeve and shaft elements having relative axial movement and connected together, so that one transmits rotary movement to the other, the sleeve being closed at one end to form an oil receptacle, the shaft being formed with a lengthwise passage opening through its ends, and a breather and separator communicating with the end of the shaft remote from the closed end of the sleeve, the breather having means for separating the air from the oil and being also formed with a check valve for retarding the inlet of air during relative axial outward movement of the shaft and the sleeve elements, and to relieve the pressure created during relative inward movement of said elements, said breather and separator being mounted on the shaft coaxial and rotatable therewith.

5. A drive mechanism comprising a supporting casing, a hollow shaft rotatable in the casing and driving and driven telescoping parts within the hollow shaft and having relative axial movement to each other, one of said telescoping elements being formed with an oil receptacle, and oil sealing means at the lower end portion of the hollow shaft and the casing including opposing metal parts rotatable with the hollow shaft and stationary relatively to the hollow shaft respectively, said parts having engaging annular surfaces, one of said parts being spring-pressed for pressing said surfaces together.

6. A drive mechanism comprising a supporting casing, a hollow shaft rotatable in the casing, driving and driven telescoping elements within the hollow shaft, one being connected to the hollow shaft to rotate therewith, one of said telescoping elements being formed with an oil receptacle, and oil sealing means at the lower end portion of the hollow shaft and the casing including parts rotatable with the hollow shaft and fixed to the casing respectively, the casing being formed with a recess in which the sealing means is located, said parts having engaging annular metal surfaces, a cap for the recess, and a bellows between the cap and the part of the sealing means associated with the casing.

7. A drive mechanism comprising a supporting casing, a hollow shaft rotatable in the casing, driving and driven telescoping elements within the hollow shaft, one being connected to the hollow shaft to rotate therewith, one of said telescoping elements being formed with an oil receptacle, and oil sealing means at the lower end portion of the hollow shaft and the casing including parts rotatable with the hollow shaft and fixed to the casing respectively, the casing being formed with a recess in which the sealing means is located, said parts having engaging annular surfaces, a cap for the recess, and a bellows between the cap and the part of the sealing means associated with the casing, a spring located within the bellows and thrusting at one end against the cap and at its other end against said part of the sealing means associated with the casing.

8. A drive mechanism comprising a supporting casing, an outer hollow shaft rotatably mounted in the casing, a sleeve slidable axially in the casing and being closed at one end forming an oil reservoir, an inner shaft extending into the hollow shaft and telescoping into the sleeve and connected thereto to rotate therewith, the inner shaft being also connected to the outer hollow shaft to rotate therewith, the inner shaft having a bore opening through its opposite ends, a breather communicating with the bore of the inner shaft at the end thereof remote from the closed end of the sleeve and having a check valve for retarding the inlet of air, whereby a partial vacuum is created during relative outward axial movement of the inner shaft and the sleeve, said valve opening to relieve the pressure within the breather during the relative axial movement of the inner shaft and the sleeve toward each other, and oil sealing means between the end of the outer hollow shaft, remote from the breather, and the casing.

9. A drive mechanism comprising a supporting casing, an outer hollow shaft rotatably mounted in the casing, a sleeve slidable axially in the hollow shaft and being closed at one end forming an oil reservoir, an inner shaft extending into the hollow shaft and telescoping into the sleeve and connected thereto to rotate therewith, the inner shaft being also connected to the hollow shaft to rotate therewith, the inner shaft having a bore opening through its opposite ends, a breather communicating with the bore of the inner shaft at the end thereof remote from the closed end of the sleeve and having a check valve for retarding the inlet of air, whereby a partial vacuum is created during relative outward axial movement of the inner shaft and the sleeve, said valve opening to relieve the pressure within the breather during the relative axial movement of the inner shaft and the sleeve toward each other, and oil sealing means between the casing and the end of the hollow shaft, remote from the breather, the casing being formed with a recess in which said oil sealing means is located, said oil sealing means comprising a collar rotatable with the hollow shaft, a metal ring associated with the casing and opposed to said collar, the collar and the ring having engaging lapped faces, a cap for closing the recess, a bellows between the cap and the ring, and a spring located within the bellows and interposed between the cap and said ring.

CARL D. PETERSON.